(12) United States Patent
Markefka (10) Patent No.: US 9,819,115 B2
(45) Date of Patent: Nov. 14, 2017

(54) PLUG AND SOCKET FOR ELECTRICAL PLUG-AND-SOCKET CONNECTION

(71) Applicant: Erich Jaeger GmbH & Co. KG, Friedberg (DE)

(72) Inventor: Klaus Markefka, Florstadt (DE)

(73) Assignee: Erich Jaeger GmbH & Co. KG, Friedberg (DE)

( * ) Notice: Subject to any disclaimer, the term of this patent is extended or adjusted under 35 U.S.C. 154(b) by 0 days.

(21) Appl. No.: 14/848,944

(22) Filed: Sep. 9, 2015

(65) Prior Publication Data

US 2017/0069997 A1  Mar. 9, 2017

(51) Int. Cl.
| | |
|---|---|
| *H01R 33/00* | (2006.01) |
| *H01R 13/52* | (2006.01) |
| *B60D 1/64* | (2006.01) |
| *H01R 24/86* | (2011.01) |

(52) U.S. Cl.
CPC ........... *H01R 13/5213* (2013.01); *B60D 1/64* (2013.01); *H01R 24/86* (2013.01); *H01R 2201/26* (2013.01)

(58) Field of Classification Search
CPC .............. H01R 2201/26; H01R 13/447; H01R 13/4534; H01R 13/4536; B60D 1/62
USPC ............ 439/34, 35, 135, 137, 138, 142, 144
See application file for complete search history.

(56) References Cited

U.S. PATENT DOCUMENTS

| | | | | |
|---|---|---|---|---|
| 4,061,407 A * | 12/1977 | Snow | .................... | H01R 13/627 439/144 |
| 4,245,875 A * | 1/1981 | Shaffer | .................. | H01R 27/00 439/144 |
| 4,784,610 A * | 11/1988 | Stuart | .................. | H01R 13/633 174/67 |
| 5,302,141 A * | 4/1994 | O'Reilly | .................. | B60D 1/64 439/144 |
| 5,747,739 A * | 5/1998 | Moeller | .............. | B60R 16/0239 174/53 |
| 6,287,136 B1 * | 9/2001 | Deutsch | ............... | H01R 13/213 439/144 |
| 6,554,626 B2 * | 4/2003 | Ramos, Jr. | ........... | H01R 13/405 439/144 |
| 6,851,958 B1 * | 2/2005 | Rowland | ............ | H01R 13/5213 439/142 |
| 7,575,450 B2 * | 8/2009 | Williams | .............. | H01R 13/639 439/144 |
| 8,288,651 B2 * | 10/2012 | Smith | ................ | H01R 13/5205 174/135 |

(Continued)

*Primary Examiner* — Thanh Tam Le
(74) *Attorney, Agent, or Firm* — McDonnell Boehnen Hulbert & Berghoff LLP (57) ABSTRACT

A plug for an electrical plug-and-socket connection comprising a plug body having plug contacts embedded in the plug body. The contacts being connectable with wires leading to the electrical circuit of a vehicle. The plug including one or more plug openings in a front face of the plug body surrounding the plug contacts for inserting contacts of a socket into the one or more plug openings providing an electrical connection between the contacts of the socket and the plug contacts. A plug protrusion extending from the plug body and placed such that a pawl protruding form an inner surface of a socket cover engages behind the plug protrusion when the plug is inserted into a plug-in opening of the socket.

21 Claims, 3 Drawing Sheets

(56) References Cited

U.S. PATENT DOCUMENTS 8,535,071 B1 * 9/2013 Mueller .................. B60D 1/64
439/144
8,876,539 B2 * 11/2014 Gette .................. H01R 13/453
439/137

* cited by examiner

PLUG AND SOCKET FOR ELECTRICAL PLUG-AND-SOCKET CONNECTION

FIELD OF THE INVENTION

The present technology relates to a plug and a socket for an electrical plug-and-socket connection generally used for the electrical interconnection of a tow vehicle or truck and a trailer. Typically, trailers are equipped with cylindrical formed plugs having a central contact terminal surrounded by a number of parameter contact terminals. A well-known standard for such a plug and the corresponding socket is the SAE J560 standard describing a plug and socket connection. The contact terminals of the plug are wired to the electrical circuit of the trailer and in particular connected to the breaks, turn signals, running signals, and break signals of the trailer. For connecting the trailer to the electrical circuit of the tow vehicle, the socket for connection of the before described plug is mounted typically at the rear end of the tow vehicle which is suited for matching the contact terminals.

BACKGROUND OF THE INVENTION

In the U.S. Pat. No. 8,876,539 B2 such a plug-and-socket connection is described with a plug having embedded plug contacts being connected with the wires leading to the electrical circuit of a vehicle. Plug openings of the plug body in front of the plug contacts are provided for inserting contacts of a socket into the plug openings thereby providing electrical connection between the socket contacts and the plug contacts. The corresponding socket comprises a socket cover having a pawl for engaging a protrusion of the plug, when the plug is inserted into a plug-in-opening of the socket. For pulling off the plug from the socket, a dissolving arm is provided having a lift part and a handling part, the arm being rotatably fixed at bearing such that upon pressing down the handling part of the dissolving arm in the direction towards the plug body, the lift part of the dissolving arm lifts away from the plug body for lifting the socket cover of the socket overlaying on the plug body.

A major problem of plug-socket-connections is their water tightness. When the plug is fitted into the plug-in-opening of the socket, a plug sealing between the outer surface of the plug body and the inner surface of the plug-in-opening of the socket provides a watertight connection between plug and socket. However, in this state (i.e. if the plug is not plugged or inserted into the plug-in opening of the socket) the socket cover having included a circular sealing for water tightly sealing the socket is overlaying the plug body without any protection of the circular sealing. Further, water can enter into the inner surface of the socket cover leading to humidity in the plug-in opening of the socket when the (wet) socket cover is later closed. On the other hand, the pawl of the socket cover has the important function of securing the plug actually plugged into the socket by engaging a protrusion at the outer surface of the plug body.

SUMMARY

It is accordingly an object of the present disclosure to provide a plug-and-socket connecting providing advanced water tightness during the overall use of the plug and the socket.

It is another object of the present disclosure to achieve better protection of the circular sealing in the socket cover at the time when a plug is plugged into the plug-in opening of the socket.

In this regard, the present disclosure proposes a plug for use in an electrical plug-and-socket connection comprising: a plug body having plug contacts embedded in said plug body, said plug contacts being connectable or connected with wires leading to the electrical circuit of a vehicle, in particular to a trailer, or to another plug; one or more plug openings in a front face of said plug body surrounding the plug contacts for inserting contacts of a socket into the one or more plug openings thereby providing an electrical connection between said contacts of the socket and said plug contacts; a plug protrusion extending e.g. basically in radial direction from the outer surface of the plug body and placed such that a pawl protruding from an inner surface of a socket cover e.g. basically in perpendicular or axial direction engages behind said plug protrusion when the plug is inserted into a plug-in opening of the socket for securing the plug in the plug-in opening against pulling the plug in axial direction off the plug-in opening wherein the socket cover is hinged around a hinge axis at the socket housing to close the plug-in opening of the socket if no plug is inserted into the socket; a cover support for supporting the socket cover when the plug is inserted into the plug-in opening of the socket said cover support surrounding the plug protrusion and defining an opening adjacent to the plug protrusion for housing the pawl of the socket cover when the pawl is engaging behind the plug protrusion.

According to a further aspect of the present disclosure, a plug for use in an electrical plug-and-socket connection is described comprising: a plug body having plug contacts embedded in said plug body, said plug contacts being connectable or connected with wires leading to the electrical circuit of a vehicle, in particular a trailer, or to another plug; one or more plug openings in a front face of said plug body surrounding the plug contacts for inserting contacts of a socket into the one or more plug openings thereby providing an electrical connection between said contacts of the socket and said plug contacts; a cover support for supporting a socket cover when the plug is inserted into the plug-in-opening of the socket wherein the plug cover is hinged around a hinge axis of the socket housing to close the plug-in opening of the socket if no plug is inserted into the socket and wherein the cover support has a circular form with a radius basically equal to the outer radius of a circular edge of the socket cover surrounding the plug-in opening when the socket cover is closing the plug-in opening.

Another aspect of the present disclosure describes a socket for use with the plug in an electrical plug-and-socket connection, comprising: a socket housing having a circular plug-in opening for mating with a plug; a plurality of contacts fixed in the plug-in opening for connecting a plug; and a socket cover for closing the plug-in opening if no plug is inserted into a socket; wherein the socket cover has a supporting structure with a circular edge surrounding the circular plug-in opening when the socket cover is closed and a hinge connecting part attached to the supporting structure for hinging the socket cover around a hinge axis at the socket housing such that the plug-in opening of the socket is closed if no plug is inserted into the socket and is opened for inserting the plug if the socket cover is rotated around the hinge axis; wherein a circular sealing is mounted at the supporting structure in the socket cover around the inner surface of the circular edge for coming into contact with the socket housing surrounding the plug-in opening when no plug is inserted into the plug-in opening; and wherein the circular sealing has a flat ring part adjacent to the circular edge of the socket cover adapted to come into contact with a sealing surface at the front edge of a plug-in opening and a radially directed seal lip part protruding from the flat ring seal part and adapted to come into contact with the inner surface of the socket housing surrounding the plug-in opening.

DETAILED DESCRIPTION

Figure 1:
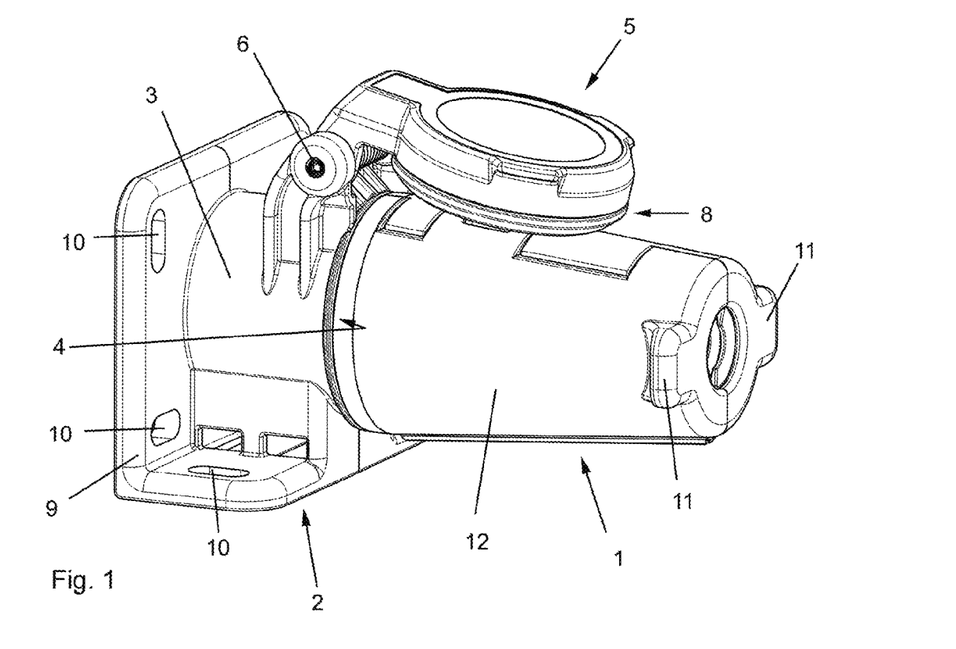
FIG. 1 shows a three-dimensional side view of an assembled plug and socket realizing the electrical plug-and-socket connection of preferred embodiment.

In FIG. 1, a plug 1 and a socket 2 according to the invention for the proposed electrical plug-and-socket connection between a trailer and a tow vehicle or truck are shown. The socket 2 has a socket housing 3 having a plug-in opening 4 (better visible in FIG. 4) for mating with the plug 1. The plug-in opening 4 can be closed by a socket cover 5 if no plug 1 is inserted into the socket 2. The socket cover 5 is hinged around a hinge axis 6 to the socket housing 3 such that the plug-in opening 4 can be opened by rotating the socket cover 5 around hinge axis 6 away from the front edge 7 of the socket housing 3 surrounding the plug-in opening 4.

If the plug 1 is inserted into the plug-in opening 4 of the socket 2, the socket cover 5 remains hinged or rotated away from the plug-in opening 4 and is supported by a cover support 8 provided at the plug 1 such that the socket cover 5 is seated or supported on the cover support 8 with the plug 1 inserted into the plug-in opening 4 to give electrical connection. This state of the plug-and-socket connection is shown in FIG. 1

For fixing the socket 2 at the tow vehicle, the socket 2 may have a flange 9 with preferably slit-like mounting holes 10 distributed at different positions at the flange 9 wherein the direction of the slits of different mounting holes 10 might be directed perpendicular to each other in order to have a freedom of adjustment when mounting the socket 2, e.g. by screws through the mounting holes 10, at a mounting plane of the tow vehicle (not shown). The flange 9 might have two flange parts directed perpendicular to each other to be able to mount the socket 2 on the mounting plane in different orientations. Preferably, each of the flange parts has at least one mounting hole 10.

A hole in size and form corresponding to a rear end of the socket housing 3 (opposed to the plug-in opening 4) may be provided in the mounting plane of the tow vehicle. Then, the rear end of the socket housing 3 (shown in FIG. 5) can be inserted into this hole of the mounting plane while the flange 9 is positioned on the mounting plane.

For a plug 1 and a socket 2, the plug 1 is axially inserted into the plug-in opening 4 by a linear movement along the central axis of the plug 1 and the socket 2 which coincidence with each other. This central axis is located in the middle of the circular plug-in opening 4 and shown as central axis 17 in FIG. 3.

Figure 2:
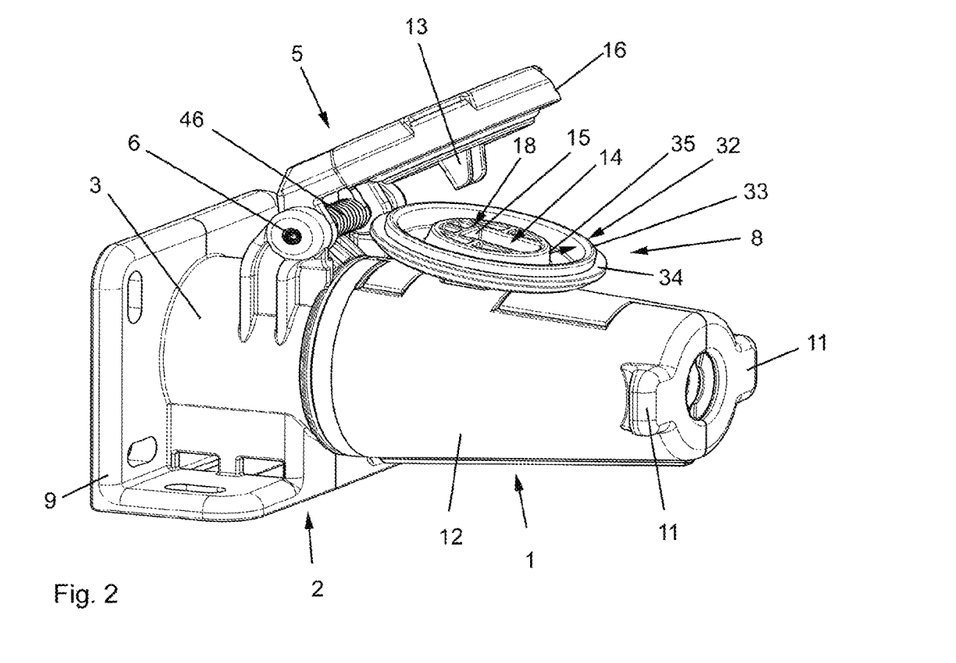
FIG. 2 shows the three-dimensional side view of FIG. 1 while assembling or dissembling the plug and the socket with a socket cover rotated around the hinge axis.

For pulling the plug 1 off the socket 2, two side handles 11 are formed protruding at the outer surface of the plug body 12 opposing to each other with respect to the central axis 17 of the plug 1. Preferably, the side handles 11 are disposed at the rear end of the plug 1 opposed to the front end of the plug 1 adapted for mating with the plug-in opening 4 of the socket 2. For inserting the plug 1 into the plug-in opening 4 or for pulling the plug 1 off the plug-in opening 4, the socket cover 5 has to be hinged or rotated around hinge axis 6 farther away from the front edge 7 of the plug-in opening 4, as shown in FIG. 2.

In this view, the structure of the socket cover 5 and the cover support 8 are visible more in detail. A pawl 13 is protruding from an inner surface of the socket cover 5 basically in perpendicular direction. This direction is the axial direction of the socket cover 5. The cover support 8 is provided an opening 14 for housing the pawl 13 when the plug 1 is inserted into the plug-in opening 4 of the socket 2 and the socket cover 5 is supported on the cover support 8.

Adjacent to the opening 14, a plug protrusion 15 is extending e.g. basically in radial direction with respect to the central axis 17 from an outer surface of the plug body 12. The plug protrusion 15 is placed such that the pawl 13 engages behind the plug protrusion 15 when the pawl 13 is housed in the opening 14. In this arrangement, the socket cover 5 is supported by the cover support 8 as shown in FIG. 1. By the engagement of the pawl 13 with the plug protrusion 15, the plug 1 in the plug-in opening 4 is secured against pulling the plug 1 in axial direction off the plug-in opening 4. This pawl-protrusion-engagement is necessary in order to secure the plug 1 in the socket 2 during use, i.e. when the tow vehicle and the trailer are moving.

Figures 4, 5:
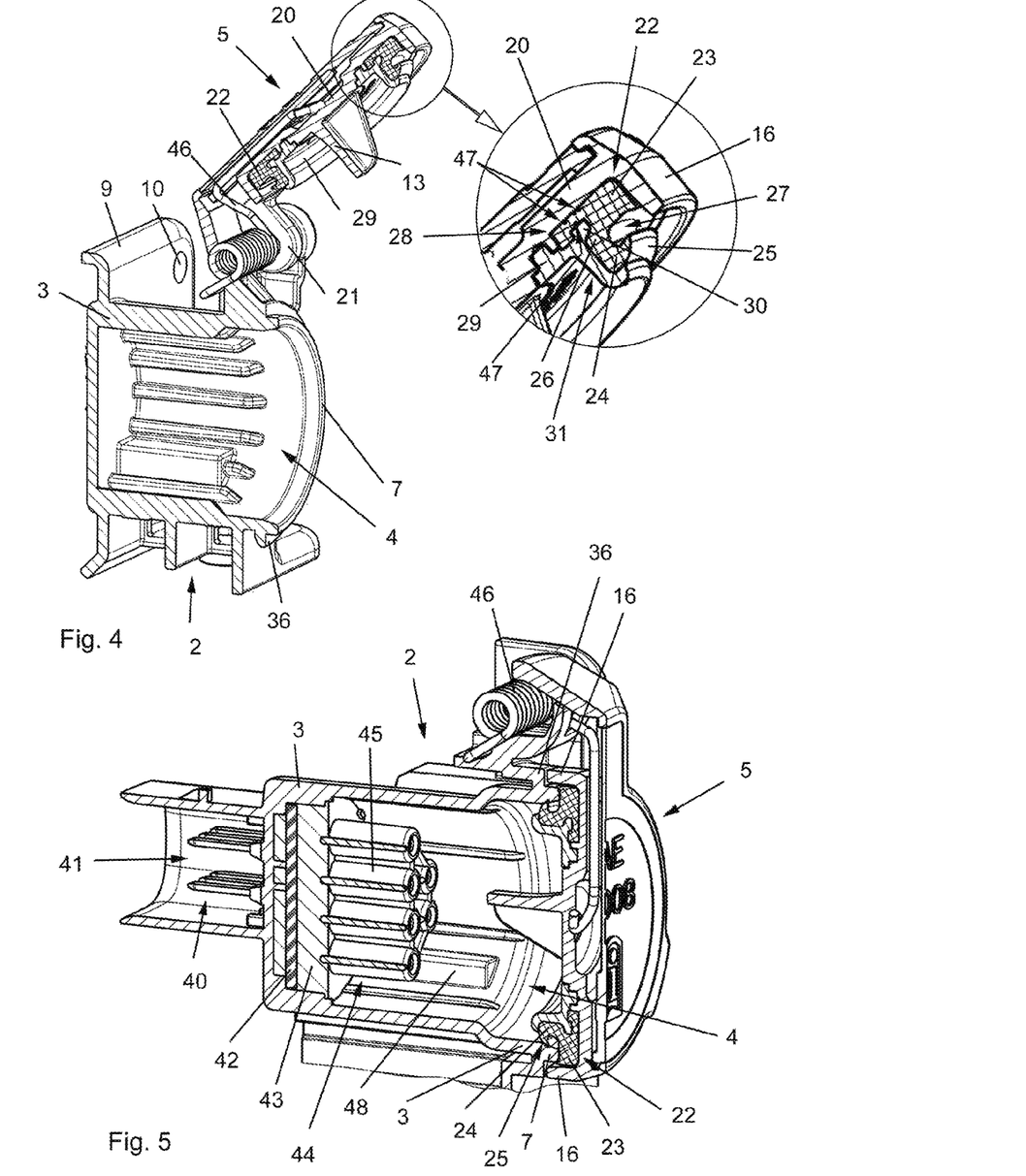
FIG. 4 shows a three-dimensional cross-sectional view of the socket of FIG. 1 only with the socket cover hinged around the hinge axis to open the plug-in opening.
FIG. 5 shows a three-dimensional cross-sectional view of the socket of FIG. 1 with the socket cover closing the plug-in opening of the socket and with the contacts of the socket.

According to an embodiment, the plug protrusion 15 is integrated into the cover support 8 as one side wall of the opening 14 for housing the pawl 13. This cover support 8 allows to protect the inner part of the socket cover 5 surrounded by a circular edge 16 of the socket cover 5 when the socket cover 5 is not closing the plug-in-opening 4. If closing the plug-in opening 4, this circular edge 16 of the socket cover 5 is surrounding the front edge 7 of the plug-in opening 4 (as shown in FIG. 5).

The more detailed structure of the socket cover 5 and the cover support 8 are described in the following with respect to FIGS. 3 to 5.

Regarding the pawl-protrusion-engagement, the engaging surface of the plug protrusion 15 is adapted to contact the engaging surface of the pawl 13 of the socket cover 5. As evident from FIG. 3, the angle between the engaging surface of the pawl 13 and the inner surface of the socket cover 5 is about 90°, i.e. in a range between 70° and 110°.

More precisely, the engaging surface of the pawl 13 is directed at the inner surface of the socket cover 5 such that the angle between the radial direction from the hinge axis 6 to the connection point between the inner surface of the socket cover 5 and the pawl 13 and the engaging surface of the pawl 13 in this connection point is close to 90° to enable effective locking of the plug 1 in the socket 2.

The angle of the engaging surface of the plug protrusion 15 with respect to the plug body is adapted such that the engaging surface of the plug protrusion 15 and the engaging surface of the pawl are in contact with each other within a contact zone, when the socket cover 5 is supported on the cover support 8. The contact zone preferably covers the major part of the engaging surfaces of the plug protrusion 15 and the pawl 13. However, the contact zone might be limited to a small area of at least about 0.08 to 0.16 inches at the free end 18 of the engaging surfaces of the plug protrusion 15. Such a small contact zone provides effective locking of the plug 1 in the socket 2.

Further, the engaging surface of the pawl 13 might be curved. Preferably, the curvature of the engaging surface of the pawl 13 follows—starting from the connection point between the inner surface of the socket cover 5 and the pawl 13—a circular path around the hinge axis 6. With bigger distance from the connection point between the inner surface of the socket cover 5 and the pawl 13, the curvature might flatten, e.g. towards a straight line at the free end of the pawl 13.

The engaging surface of the plug protrusion 15 is preferably curved correspondingly to the curvature of the engaging surface of the pawl 13 so that the engaging surface of the plug protrusion 15 and the engaging surface of the pawl 13 are engaging at least along their overlapping contact zone. The curvature of the engaging surface of the plug protrusion 15 has accordingly a convex form. This means that the engaging surface is protruding from an imaginary connection line connecting the one end of the engaging surface directing towards the plug body to the opposite other free end 18 of the engaging surface.

It is further preferred that the radial distance between the free end 18 of the plug protrusion 15 and the central axis 17 of the plug 1 does not exceed the radial distance between the hinge axis 6 and the central axis 17 if plug 1 is inserted into the plug-in opening 4 of the socket 2.

According to another embodiment, the angle between the engaging surface of the pawl 13 and the radial direction from the hinge axis 6 to the connection point between the inner surface of the socket cover 5 and the pawl 13 might be bigger than 90°, in particular in the range between >90° and 105°. This geometry and arrangement of the pawl 13 and the plug protrusion 15 has the advantage that high pulling forces applied to the plug 1 in axial direction, i.e. the direction of the central axis 17, lead to a rotation of the socket cover 5 around the hinge axis 6 to unlock the engagement between the pawl 13 and the plug protrusion 15. Thus, even pulling plug 1 of the socket 2 by the wires or cable (not shown in the figures) would lead to a release of plug 1 without damage to the wire connection in the plug 1 protected by a strain relief element 19. This is called a breakaway function. The strain relief element 19 is described in U.S. patent application Ser. No. 14/728,179 herein entirely incorporated by reference and to which the reader is directed for further information.

Accordingly, it is possible to include the pawl-protrusion engagement with a self-releasing mechanism into the cover support 8 of plug 1 to support socket cover 5 if plug 1 is inserted into the plug-in opening 4 of socket 2 and secured by the pawl-protrusion engagement in this position.

If in contrast no breakaway function is to be realized, the angle between the engaging surface of the pawl 13 and the radial direction from the hinge axis 6 to the connection point between the inner surface of the socket cover 5 and the pawl 13 should be close to 90°. A change between the socket-plug connection with or without breakaway function might be realized be amending the angle of the engaging surface of the pawl of the socket cover 5. An adaption of the engaging surface of the plug protrusion 15 is not necessary, but can be performed anyway.

Following, the protection of the socket cover 5 on the cover support 8 leading to an increased water tightness of the plug-and socket connection is described in detail.

The socket cover 5 has supporting structure 20 with the circular edge 16 surrounding the circular plug-in opening 4 when the socket cover 5 is closed. The circular edge 16 may be integrally formed with the supporting structure 20. The hinge connecting part 21 is attached to the supporting structure 20 for hinging the socket cover 5 around the hinge axis 6 at the socket housing 3 such that the plug-in opening 4 of the socket 2 is closed if no plug 1 is inserted into the socket 2 and is opened for inserting the plug 1 if the socket cover 5 is rotated around the hinge axis 6.

A circular sealing 22 is mounted at the supporting structure 20 in the socket cover 5 around the inner surface of the circular edge 16 for coming into contact with the socket housing 3 and in particular the front edge 7 of the socket housing 3 surrounding the plug-in opening 4 when no plug 1 is inserted into the plug-in opening 4 (see FIG. 5).

According to a preferred embodiment, the circular sealing 22 has a flat ring seal part 23 adjacent to the circular edge 16 adapted to come into contact with a sealing surface at the front edge 7 of the plug-in opening as evident FIG. 5.

Further, the circular sealing 22 has a radially directed seal lip part 24 protruding from the flat ring seal part 23 and adapted to come into contact with a sealing surface at the inner surface of the socket housing 3 surrounding the plug-in opening 4 as evident from FIG. 5.

Accordingly, the circular sealing 22 has a double seal effect. A first seal effect is achieved by the flat ring sealing part 23 abutting against the front edge 7 of the socket housing. A second seal effect is achieved downstream by a lip 25 of the radially directed seal lip part 24 abutting against the inner surface of the socket housing 3 surrounding the plug-in opening 4. Accordingly, even if water might enter between the flat ring seal part 23 of the circular sealing 22 and the front edge 7 of the socket housing 3, e.g. due to dirt particles between the front edge 7 and the flat ring seal part 23, the water cannot enter into plug-in opening 4 due to the downstream seal effect of lip 25 against the inner surface of the socket housing 3.

Accordingly, the water tightness of the socket 2 with closed socket cover 5 (as shown in FIG. 5) is enhanced. The lip 25 of the radially directed seal lip part 24 has a tip directed radially outward with respect to the axis of the circular edge 16 of the socket cover 5. With respect to this axis of the circular edge 16, the double seal effect of the circular sealing 22 might be described as an axial sealing between the flat ring seal part 23 and the front edge 7 and a radial sealing between the tip of lip 25 and the inner surface of the socket housing 3.

As evident form the enlarged detail of FIG. 4, the lip 25 with it's tip is attached to the inner corner of the flat ring seal part 23 with a ligament 26 such that a clearance 27 remains between the lip 25, the flat ring seal part 23 and also the inner surface of the socket housing 3, when the socket cover 5 is closing the plug-in opening 4 (see FIG. 5). Accordingly, the ligament 26 is connected to a flat ring seal part 23 directed radially towards the center of the circular sealing 22 and protruding also in axial direction away from the flat ring seal part 23.

The circular sealing 22 might further have an arm 28 extending radially inward from the flat ring seal part 23 such that the flat ring seal part 23 and the extending arm 28 form one continuous (at least almost flat) surface housed in the supporting structure 20 of the socket cover 5 such that the flat surface is held in a recess of the inner surface of the supporting structure 20 or the socket cover, respectively. Preferably, a gap remains between the extending arm 28 and the radially directed seal lip part 24. This structure might be used for fixing the circular sealing 22 in the socket cover 5 or its supporting structure 20.

To this aim, a retainer ring 29 might be attached to the supporting structure 20 radially inwards with respect to the arm 28 of the circular sealing 22, e.g. by snapping in, gluing, ultrasonic welding or the like.

The retainer ring 29 preferably has a gap filling structure 30 for fitting into the gap between the extending arm 28 and the radially directed lip seal part 24. The circular sealing 22 is thus effectively pressed against the inner surface of the circular edge 16 thereby producing a radially directed fixing force. On the gap filling structure 30 and the opposed surface of the supporting structure 20 of the socket cover 5, there might be provided annular protrusions 47 (rings) pressing from both sides into the circular sealing 22, and in particular into the radially extending 28 arm of the circular sealing 22 for sealing against the inner surface of the socket cover 5, in particular the supporting structure 20. There might be three annular protrusions 47 displaced to each other in the direction of the radially extending arm 28. Preferably, there are provided two annular protrusions 47 on the supporting structure 20 and one annular protrusion 47 on the gap filling structure 30 wherein the annular protrusion 47 on the gap filling structure 30 is (in radial direction of the socket cover 5) disposed between the two annular protrusions 47 on the supporting structure 20.

Further, the retainer ring 29 might have a leading arm 31 to engage and support the radially inner surface of the radially directed seal lip part 23. According to a preferred embodiment, the gap filling structure 30 is accordingly extending in radial direction outwards of the retainer ring center and the leading arm 31 is basically extending in axial direction of the retainer ring center axis. The leading arm 31 is accordingly securing the abutment force of the lip 25 against the inner surface of the socket housing 3. An optimized guiding of the lip 25 is achieved if the leading arm 31 is bend radially outward at its free end guiding the lip 25 radially outward.

In order to achieve a defined and enhanced closing force, the socket 2 comprises a spring 46 with a center-point rest carrying a closing force to the socket cover 5 in abutment against the front edge 7 of the socket housing 3 surrounding the plug-in opening 4 and/or against the cover support 8 of the plug 1.

Figure 3:
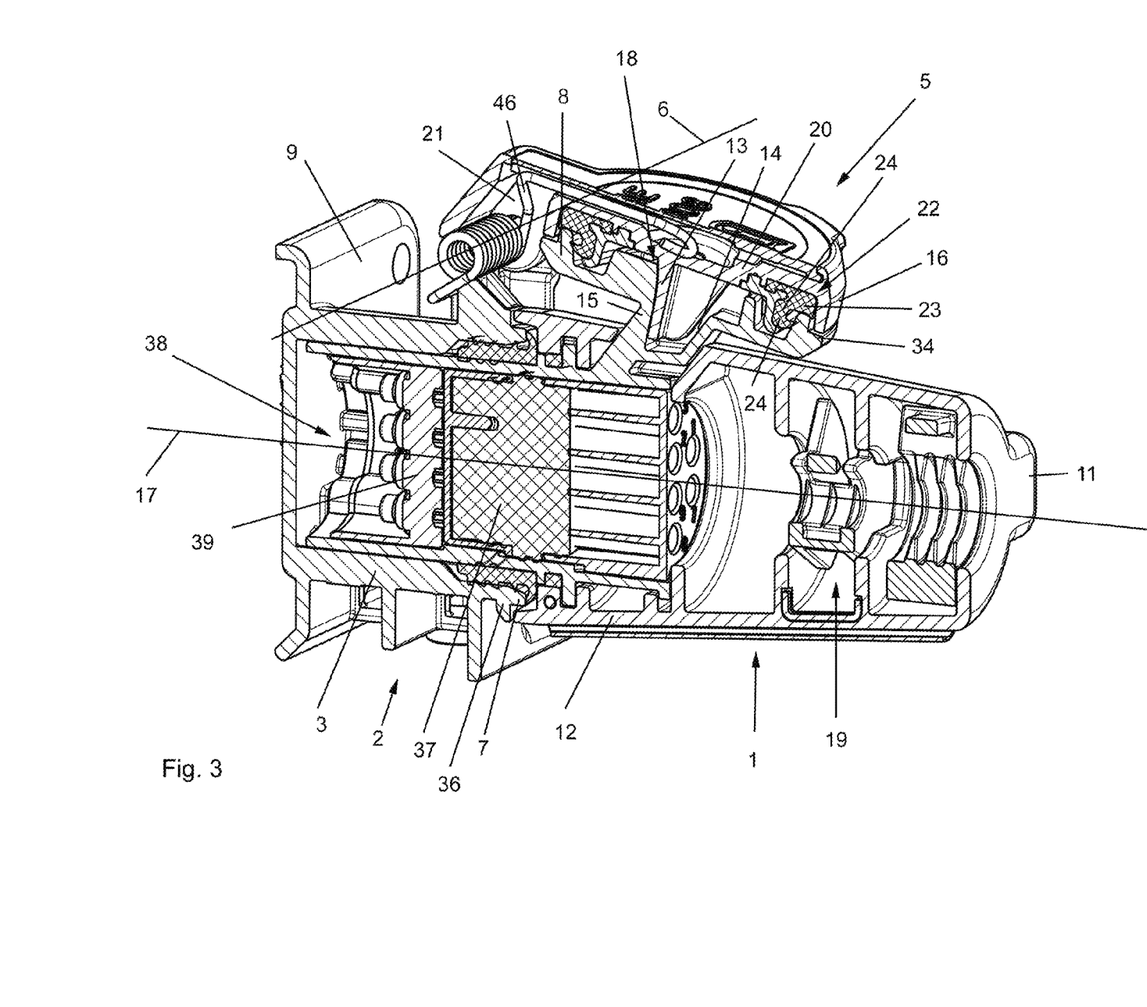
FIG. 3 shows a three-dimensional cross-sectional view of FIG. 1 of the assembled plug and socket without the contacts of the socket for clarity reasons.

If the socket cover 5 is supported on the cover support 8, the pawl 13 extending from the inner surface of the socket cover 5 or more precisely from the supporting structure 20 of the socket cover 5 is inserted into the opening 14 of the cover support 8 for housing the pawl 13 (see FIG. 3). The radial and axial seal effect of a circular sealing 22 is preferably also used within the cover support 8. This double seal effect can be used also irrespective of providing a pawl 13, a plug protrusion 15 and the corresponding opening 14 for housing the pawl 13 of the socket cover 5. This means, that the radially and axially acting circular sealing 22 of the socket cover 5 can also be used in a plug-and-socket connection without pawl-protrusion engagement for securing the plug 1 in the plug-in opening 4 of the socket 2.

As evident from FIG. 2, the cover support 8 has a circular ring 32 protruding from a plane defined by a flange-like edge 34 of the cover support 8. The circular ring 32 has at least one sealing surface adapted to contact the circular sealing 22 mounted in the socket cover 5.

More in detail, one axial sealing surface 33 is disposed in axial direction of the circular ring 32 to come into contact with the flat ring seal part 23 of the circular sealing 22 in the socket cover 5. This axial sealing surface 33 is formed at the farthest projecting part of the cover support 8 in axial direction of the cover support 8. It is this axial sealing surface 33 defining a support plane of the cover support 8 for supporting the socket cover 5. Accordingly, between the axial sealing surface 33 and the flat ring seal part 23 a similar sealing effect is achieved compared to the sealing effect between the front edge 7 of the socket housing 3 and the flat ring seal part 23 when the cover socket 5 is closing the plug-in opening 4.

Further, one radial sealing surface 35 is provided at the inner surface of the circular ring 32 to come into contact with the radially directed seal lip part 24 of the circular sealing 32, and in particular with the lip 25 of the radially directed seal lip part 24. To this aim it is advantageous, if the radially inner surface of the circular ring 32 is (in axial direction of the circular cover support 8) higher than the radial outer surface of the circular ring 32 adjacent to the flange-like edge 34. Thus, the radial sealing surface 35 of the cover support 8 corresponds to an inner surface of the socket housing 3 surrounding the plug-in opening 4.

Accordingly, the water tightness between the socket cover 5 and the cover support 8 is comparable to the water tightness between the socket cover 5 and the socket housing 3. Accordingly, water will be prevented from entering in the free space between the socket cover 5 and the cover support 8.

However, there is another important aspect of the described arrangement of the proposed cover support 8. As the cover support 8 is reproducing the geometry of the socket housing 3 surrounding the plug-in opening 4, the circular sealing 2 is also protected against any damage when the socket cover 5 is supported by the cover support 8.

According to further preferred aspect of the proposed cover support 8 of the plug 1, cavities defined within the circular ring 32 of a cover support 8 (such as the opening 14 for housing the pawl 13 and a nut defined between the radially inner surface of the circular ring 32 and an outer surface of a wall surrounding a plug protrusion 15 and the opening 14 for housing the pawl 13) might be air-tightly closed at their bottom such that the cavities are air-tightly closed when the socket cover 5 with the circular sealing 22 is supported by the cover support 8.

As the volume of the cavities inside the cover support 8 is quite small, a significant low pressure is developing when the socket cover 5 is being started to lift up from the cover support 8 by rotating the socket cover 5 around the hinge axis 6. This is due to the fact that the lip 25 still seals these cavities inside the cover support 8, even if the flat ring seal part 23 is partly moving away from the axial sealing surface 23. This low pressure tends to keep the socket cover 5 closely supported on the cover support 8 and works against an unintentional movement of the socket cover 5 away from the cover support 8 during use.

Another optional measure to avoid an unintentional movement of the socket cover 5 supported on the cover support 8 is the form of the cover support 8. It might be provided that the cover support 8 has a circular form with a radius corresponding to the outer radius of the circular edge 16 of the socket cover 5 surrounding the plug-in opening 4 when the socket cover 5 is closing a plug-in opening 4. By providing a cover support 5 with this radius, the flange-like edge 34 is provided protruding from the circular ring 32 to cover the front surface of the circular edge 16. As evident in FIG. 3, the outer radius of the flange-like edge 34 and the circular edge 16 correspond to each other so that no radial protrusion occurs between the cover support 8 (and it's flange like edge 34) and the circular edge 16. Accordingly, unintentional axially acting forces might hardly act on the circular edge 16 to lift up the socket cover 5 from the cover support 8.

For similar reason, there also might be provided a flange-like protrusion 36 at the outer surface of a socket housing 3 adjacent to the front edge 7 surrounding the plug-in opening 4, as demonstrated in FIGS. 4 and 5.

The supporting plane of the cover support 8 for supporting the socket cover 5 is tilted with respect to a central axis 17 of a plug 1 such that the supporting plane is parallel to the plane defined by a circular edge 16 of a socket cover 5 or the circular sealing 22, respectively, when the socket cover 5 is supported on the cover support 8. The supporting plane is preferably defined by the axial sealing surface 33 of the circular ring 32 of the cover support 8. Alternatively, also the flange-like edge 34 of the cover support 8 might be used as supporting plane of the cover support 8.

The plug body 12 has further plug contacts (not shown in the figures) embedded in the plug body 12 via a contact insert 37 as shown in FIG. 3. The plug contacts are connectable with wires (not shown) leading from the contact insert 37 through the strain relief element 19 out of the plug body 12 to the electrical circuit of a vehicle/trailer or to another plug. In the front face of the plug body 12 there is provided one plug opening 38 surrounding the plug contacts for inserting contacts of a socket (not shown in FIG. 3) into the plug opening 38 thereby providing an electrical connection between the contacts of the socket 1 and the plug contacts.

The plug contacts might be hold and guided inside the plug opening 38 by a plug contact holder 39.

On the other hand, also the socket 2 shown in FIG. 5 has a plurality of contacts (not shown) fixed in the plug-opening 4 for connecting with the plug 1. These contacts of the socket 2 might be arranged in a circular or cross-like arrangement. At the inner wall of the plug-in opening 4, there is provided a rotation lock member 48 engaging the plug 1 when the plug is inserted into the plug-in opening 4. This rotation lock member 48 ensures that the plug 1 is connected to the socket in the one and only desired rotational position, thus also securing a correct position of the cover support 8 with respect to the socket cover 5.

Further, a plurality of connecting ends 40 of that contacts of the socket 2 are disposed in a connection opening 41 of the socket housing 3 and electrically connected with the contacts of the socket 2 fixed in the plug-in opening 4. The connecting ends 40 might be disposed in a linear arrangement comprising for example two lines of contacting ends 40.

The connecting ends 40 and the contacts of the socket 2 might be disposed in a different contact arrangement. To this aim, the contacts of the socket 2 and the connecting ends 40 might be fixed on opposite sides of a printed circuit board 42 inserted on the bottom of the plug-in opening 4. The printed circuit board 42 can be fixed and sealed at the bottom of the plug-in opening 4 by molding in a suited plastic material 43.

To avoid short cuts between the contacts fixed in the plug-in opening 4, these contacts might be covered by a protection cover 44 having bush-like element 45 connected with each other wherein each bush-like element 45 is laterally surrounding one of the contacts. Also the protection cover 44 can be fixed to the contacts by molding with a suited plastic material 43. This can be performed in the same molding step when securing and sealing the printed circuit board 42 at the bottom of the plug-in opening 4.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

LIST OF REFERENCE NUMBERS 1 plug
2 socket
3 socket housing
4 plug-in opening
5 socket cover
6 hinge axis
7 front edge
8 cover support
9 flange
10 mounting hole
11 side handle
12 plug body
13 pawl
14 opening for housing the pawl
15 plug protrusion
16 circular edge
17 central axis
18 free end of plug protrusion
19 strain relief element
20 supporting structure
21 hinge connecting
22 circular sealing
23 flat ring seal part
24 radially directed seal lip part
25 lip
26 ligament
27 clearance
28 radially extending arm
29 retainer ring
30 gap filling structure
31 leading arm
32 circular ring
33 axial sealing surface
34 flange-like edge
35 radial sealing surface
36 flange like protrusion
37 contact insert
38 plug opening
39 plug contact holder
40 connecting ends
41 connection opening
42 printed circuit board
43 plastic material
44 protection cover
45 bush-like element
46 spring
47 annular protrusions
48 rotation lock member

What is claimed is:

1. A plug for an electrical plug-and-socket connection comprising:
   (a) a plug body having plug contacts embedded in said plug body, said plug contacts being connectable or connected with wires leading to the electrical circuit of a vehicle, in particular to a trailer, or to another plug;

(b) one or more plug openings in a front face of said plug body surrounding the plug contacts for inserting contacts of a socket into the one or more plug openings thereby providing an electrical connection between said contacts of the socket and said plug contacts;

(c) a plug protrusion extending from a outer surface of the plug body and placed such that a pawl protruding from an inner surface of a socket cover engages behind said plug protrusion when the plug is inserted into a plug-in opening of the socket for securing the plug in the plug-in opening against pulling the plug in axial direction of the plug-in opening, wherein the socket cover is hinged around a hinge axis at the socket housing to close the plug-in opening of the socked if no plug is inserted into the socket;

(d) a cover support for supporting the socket cover when the plug is inserted into the plug-in opening of the socket, said cover support surrounding the plug protrusion and defining an opening adjacent to the plug protrusion for housing the pawl of the socket cover when the pawl is engaging behind the plug protrusion wherein the cover support has a circular form with a radius corresponding to outer radius of a circular edge of the socket cover surrounding the plug-in opening when the socket cover is closing the plug-in opening.

2. The plug according to claim 1 wherein an engaging surface of the plug protrusion is adapted to contact an engaging surface of the pawl of the socket cover, wherein a angle between the engaging surface of the pawl and the inner surface of the socket cover is about 90°.

3. The plug according to claim 2 wherein the angle between the engaging surface of the pawl and a radial direction from the hinge axis to a connection point between the inner surface of the socket cover and the pawl is close to 90° or is in the range between >90° and 105°.

4. The plug according to claim 1 wherein an engaging surface of the plug protrusion is curved.

5. The plug according to claim 4 wherein the curvature of the engaging surface of the plug protrusion has a convex form.

6. The plug according to claim 1 wherein a radial distance between a free end of the plug protrusion and a central axis of the plug does not exceed the radial distance of the hinge axis to the central axis of plug inserted to the plug-in opening of the socket.

7. The plug according to claim 1 wherein the cover support has a circular ring with at least one sealing surface protruding from a plane defined by a flange-like edge of the cover support and adapted to contact a circular sealing mounted in the socket cover.

8. The plug according to claim 7 wherein one axial sealing surface is disposed in axial direction of the circular ring to come into contact with a flat ring seal part of the circular sealing of the socket cover.

9. The plug according to claim 8 wherein the axial sealing surface is formed at the farthest projecting part of the cover support in axial direction of the cover support.

10. The plug according to claim 7 wherein one radial sealing surface is placed at the radial inner surface of the circular ring to come into contact with a radially directed seal lip part of the circular sealing of the socket cover.

11. The plug according to claim 7 wherein the radially inner surface of the circular ring is higher than the radial outer surface of the circular ring.

12. The plug according to claim 7 wherein all cavities defined within the circular ring of the cover support are closed at their bottom such that the cavities are air-tightly closed when the socket cover with the circular sealing is supported by the cover support.

13. The plug according to claim 1 wherein the a supporting plane of the cover support for supporting the socket cover is tilted with respect to the central axis of the plug such that the supporting plane is parallel to a plane defined by a circular edge of the socket cover when the socket cover is supported by the cover support.

14. A plug for an electrical plug-and-socket connection comprising:

(a) a plug body having plug contacts embedded in said plug body, said plug contacts being connectable or connected with wires leading to the electrical circuit of a vehicle, in particular to a trailer, or to another plug;

(b) one or more plug openings in a front face of said plug body surrounding the plug contacts for inserting contacts of a socket into the one or more plug openings thereby providing an electrical connection between said contacts of the socket and said plug contacts;

(c) a cover support for supporting a socket cover when the plug is inserted into a plug-in opening of the socket wherein the plug cover is hinged around a hinge axis at the socket housing to close the plug-in opening of the socked if no plug is inserted into the socket and wherein the cover support has a circular form with a radius basically equal to outer radius of the of a circular edge of the socket cover surrounding the plug-in opening when the socket cover is closing the plug-in opening.

15. The plug according to claim 14 wherein the cover support has a circular ring with at least one sealing surface protruding from a plane defined by a flange-like edge of the cover support and adapted to contact a circular sealing mounted in the socket cover.

16. The plug according to claim 15 wherein one axial sealing surface is placed in axial direction of the circular ring to come into contact with a flat ring seal part of the circular sealing.

17. The plug according to claim 16 wherein the axial sealing surface is formed at the farthest projecting part of the cover support in axial direction of the cover support.

18. The plug according to claim 15 wherein one radial sealing surface is placed at the radial inner surface of the circular ring to come into contact with a radially directed seal lip part of the circular sealing of the socket cover.

19. The plug according to claim 15 wherein the radially inner surface of the circular ring is higher than the radial outer surface of the circular ring.

20. The plug according to claim 15 wherein all cavities defined within the circular ring of the cover support are closed at their bottom such that the cavities are air-tightly closed when the socket cover with the circular sealing is supported by the cover support.

21. The plug according to claim 14 wherein a supporting plane of the cover support for supporting the socket cover is tilted with respect to a central axis of the plug such that the supporting plane is parallel to a plane defined by the circular edge of the socket cover when the socket cover is supported by the cover support.

* * * * *